(12) United States Patent
Chandler et al.

(10) Patent No.: US 9,567,062 B2
(45) Date of Patent: Feb. 14, 2017

(54) BOX WING WITH ANGLED GAS TURBINE ENGINE CORES

(71) Applicant: United Technologies Corporation, Hartford, CT (US)

(72) Inventors: Jesse M. Chandler, South Windsor, CT (US); Gabriel L. Suciu, Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 110 days.

(21) Appl. No.: 14/440,895

(22) PCT Filed: Mar. 14, 2013

(86) PCT No.: PCT/US2013/031211
§ 371 (c)(1),
(2) Date: May 6, 2015

(87) PCT Pub. No.: WO2014/074146
PCT Pub. Date: May 15, 2014

(65) Prior Publication Data
US 2015/0336655 A1    Nov. 26, 2015

Related U.S. Application Data

(60) Provisional application No. 61/725,158, filed on Nov. 12, 2012.

(51) Int. Cl.
*B64D 27/14* (2006.01)
*B64C 39/06* (2006.01)
(Continued)

(52) U.S. Cl.
CPC . *B64C 3/14* (2013.01); *B64C 5/06* (2013.01); *B64C 39/068* (2013.01); *B64C 39/10* (2013.01);
(Continued)

(58) Field of Classification Search
CPC ......... B64D 27/08; B64D 27/14; B64D 27/20; B64D 33/04; B64C 39/068; F05D 2250/314; F02C 7/20
See application file for complete search history.

(56) References Cited

U.S. PATENT DOCUMENTS

| 4,365,773 A | 12/1982 | Wolkovitch |
| 4,500,055 A | 2/1985 | Krojer |

(Continued)

OTHER PUBLICATIONS

International Search Report and Written Opinion for International Application No. PCT/US2013/031211 mailed on Dec. 4, 2013.
(Continued)

*Primary Examiner* — Tien Dinh
*Assistant Examiner* — Richard R Green
(74) *Attorney, Agent, or Firm* — Carlson, Gaskey & Olds, P.C.

(57) ABSTRACT

An aircraft including a fuselage having a forward portion and an aft portion with a propulsion system mounted within the aft portion of the fuselage. A burst zone is defined that extends outward from the propulsion system. The aircraft includes a box wing extending from the aft portion of the fuselage to a forward portion of the fuselage that is disposed outside of the burst zone.

18 Claims, 4 Drawing Sheets

(51) Int. Cl.
  *B64D 33/04*  (2006.01)
  *B64C 3/14*  (2006.01)
  *B64C 39/12*  (2006.01)
  *B64C 39/10*  (2006.01)
  *B64C 5/06*  (2006.01)
  *F02K 1/56*  (2006.01)
  *F02K 1/78*  (2006.01)

(52) U.S. Cl.
  CPC ............... *B64C 39/12* (2013.01); *B64D 27/14* (2013.01); *B64D 33/04* (2013.01); *F02K 1/56* (2013.01); *F02K 1/78* (2013.01)

(56) References Cited

U.S. PATENT DOCUMENTS

| | | |
|---|---|---|
| 5,131,605 A | 7/1992 | Kress |
| 5,899,409 A | 5/1999 | Frediani |
| 6,199,795 B1 * | 3/2001 | Williams ............... B64D 27/20 244/55 |
| 6,543,718 B2 | 4/2003 | Provost |
| 6,792,746 B2 | 9/2004 | Saito et al. |
| 7,107,755 B2 | 9/2006 | El Hamel et al. |
| 7,540,450 B2 | 6/2009 | Brand et al. |
| 7,775,834 B2 | 8/2010 | Zauber et al. |
| 8,015,796 B2 | 9/2011 | Babu et al. |
| 8,167,239 B2 | 5/2012 | Guering et al. |
| 8,186,617 B2 | 5/2012 | Llamas Sandin |
| 2004/0025493 A1 | 2/2004 | Wojciechowski |
| 2006/0144991 A1 | 7/2006 | Frediani |
| 2010/0155526 A1 | 6/2010 | Negulescu |
| 2012/0272656 A1 | 11/2012 | Norris |
| 2014/0054413 A1 * | 2/2014 | Cazals .................. B64D 27/14 244/54 |

OTHER PUBLICATIONS

International Preliminary Report on Patentability for International Application No. PCT/US2013/031211 mailed May 21, 2015.

\* cited by examiner

BOX WING WITH ANGLED GAS TURBINE ENGINE CORES

CROSS REFERENCE TO RELATED APPLICATION

This application claims priority to U.S. Provisional Application No. 61/725,158 filed on Nov. 12, 2012.

BACKGROUND

Conventional aircraft architecture includes wing mounted gas turbine engines. In some aircraft architectures gas turbine engines are mounted atop the fuselage or on opposite sides of the aircraft fuselage.

Commercial aircraft typically utilize gas turbine engines that in include a fan section driven by an engine core or gas generator. The engine core includes a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section through a driven shaft.

Alternate aircraft architectures may require alternate mounting locations of the gas turbine engines to enable specific wing and fuselage configurations. However, conventional gas turbine engine configurations have been developed to operate with conventional aircraft architectures.

Accordingly, alternate gas turbine engine configurations may be required and developed to enable implementation of favorable aspects of alternate engine architectures.

SUMMARY

A aircraft lift system according to an exemplary embodiment of this disclosure, among other possible things includes an aft portion of a fuselage and a propulsion system mounted within the aft portion of the fuselage. The propulsion system includes first and second turbine engines, including respective first and second engine cores mounted so that respective first and second axes running therethrough are not-parallel. A defined burst zone from the engine cores extends outward and at a forward swept angle from the propulsion system, so that the burst zone has respective first and second forward edges. A box wing extends at a forward swept angle from the aft portion of the fuselage. First and second trailing edges of the box wing are disposed between respective first and second forward edges of the burst zone and the fuselage.

In a further embodiment of the foregoing system, the box wing is a rhomboidal wing.

In a further embodiment of any of the foregoing systems, the box wing includes a forward primary wing portion and an upper horizontal stabilizer attached to the forward primary wing structure.

In a further embodiment of any of the foregoing systems, includes a vertical stabilizer extending from the aft portion of the fuselage supporting the upper horizontal stabilizer.

In a further embodiment of any of the foregoing systems, the vertical stabilizer is swept forward.

In a further embodiment of any of the foregoing systems, the propulsion system includes a first turbine engine including a first engine core that drives a first propulsor. The first propulsor is disposed about a first propulsor axis and a second turbine engine including a second engine core and a second propulsor. The second propulsor is disposed about a second propulsor axis parallel to the first propulsor axis. The first engine core and the second engine core are mounted at an angle relative to a corresponding one of the first and second propulsor axes.

In a further embodiment of any of the foregoing aircrafts, the first engine core is disposed about a first engine axis and the second engine core is disposed about a second engine axis. The first engine axis and the second engine axis are angled away from each other.

In a further embodiment of any of the foregoing aircrafts, a burst zone is defined about each of the first and second engine cores.

In a further embodiment of any of the foregoing aircrafts, each of the first and second engine cores are each disposed outside of a burst zone defined about the other of the first and second engine cores.

In a further embodiment of any of the foregoing aircrafts, the burst zone is defined as burst angle relative to a line extending perpendicular to each end of the corresponding first and second engine core.

In a further embodiment of any of the foregoing aircrafts, the first and second engine cores include a reverse flow gas turbine engine.

An aircraft according to an exemplary embodiment of this disclosure, among other possible things includes a fuselage including a forward portion and an aft portion, and a first turbine engine including a first engine core that drives a first propulsor. The first propulsor is disposed about a first propulsor axis. A second turbine engine includes a second engine core and a second propulsor. The second propulsor is disposed about a second propulsor axis parallel to the first propulsor axis. The first engine core and the second engine core are mounted at an angle relative a corresponding one of the first and second propulsor axes. A defined burst zone extends outward from each of the first and second engine cores. A box wing extends from the aft portion of the fuselage to a forward portion of the fuselage. The box wing is disposed outside of the burst zone.

In a further embodiment of the foregoing aircraft the box wing includes a forward primary wing portion and an upper horizontal stabilizer attached to the forward primary wing structure.

In a further embodiment of any of the foregoing aircrafts, includes a vertical stabilizer extending from the aft portion of the fuselage supporting the upper horizontal stabilizer.

In a further embodiment of any of the foregoing aircrafts, the vertical stabilizer is swept forward.

In a further embodiment of any of the foregoing aircrafts, the first engine core is disposed about a first engine axis and the second engine core is disposed about a second engine axis, wherein the first engine axis and the second engine axis are angled away from each other.

In a further embodiment of any of the foregoing aircrafts, each of the first and second engine cores are each disposed outside of a burst zone defined about the other of the first and second engine cores.

In a further embodiment of any of the foregoing aircrafts, the first and second engine cores include a reverse flow gas turbine engine.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
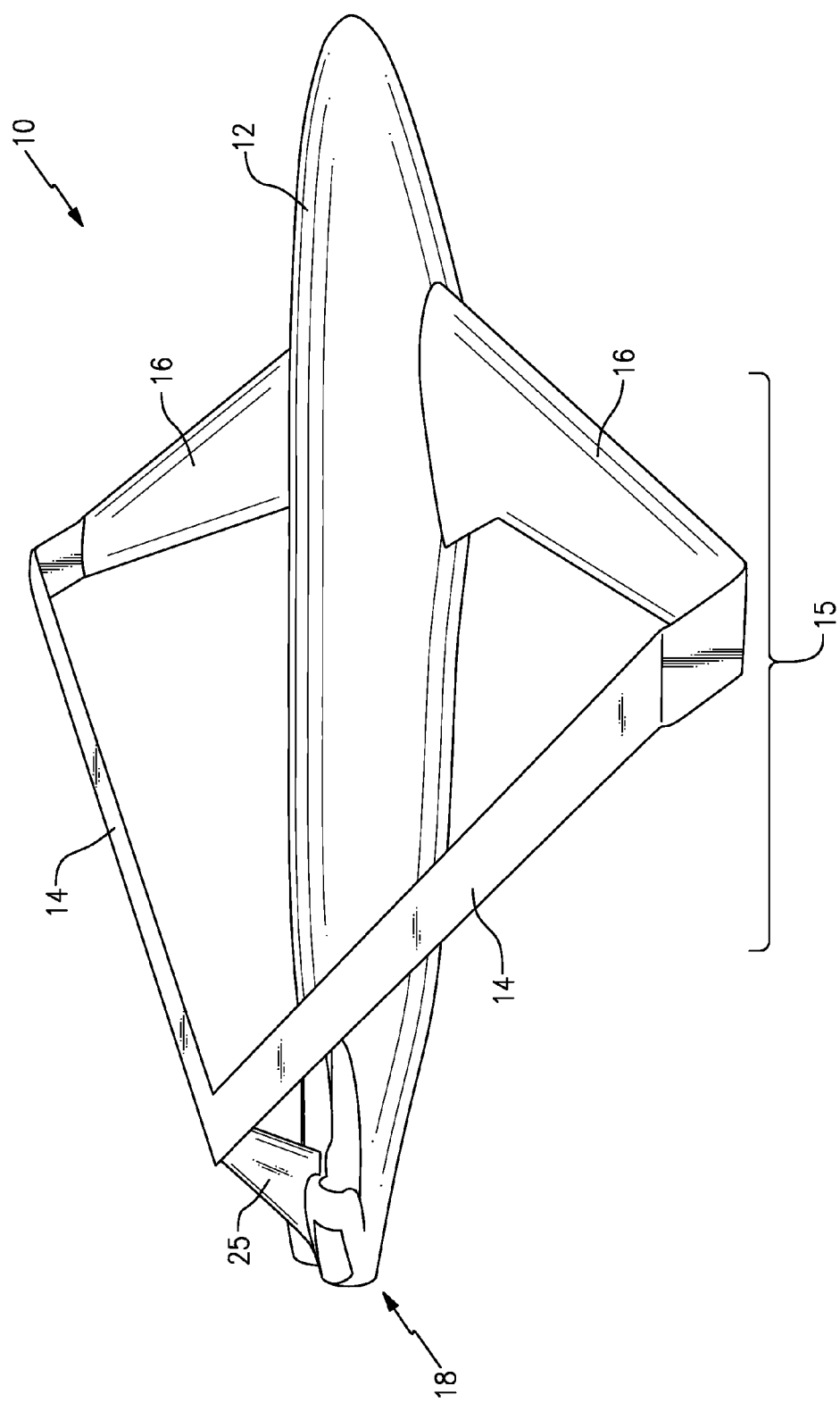
FIG. 1 is a schematic view of an example aircraft and propulsion system.

Referring to the FIG. 1 an aircraft 10 includes a fuselage 12 supporting a propulsion system 18 in an aft portion and a box wing 15 that extends forward from the aft portion of the fuselage to a forward portion of the fuselage. The box wing 15 includes primary wings 16 and an upper horizontal stabilizer 14 extending from a swept forward vertical stabilizer 25. In one example the box wing a rhomboidal wing, however other configurations referred to as a box wing 15 are also within the contemplation of this disclosure.

Figure 2:
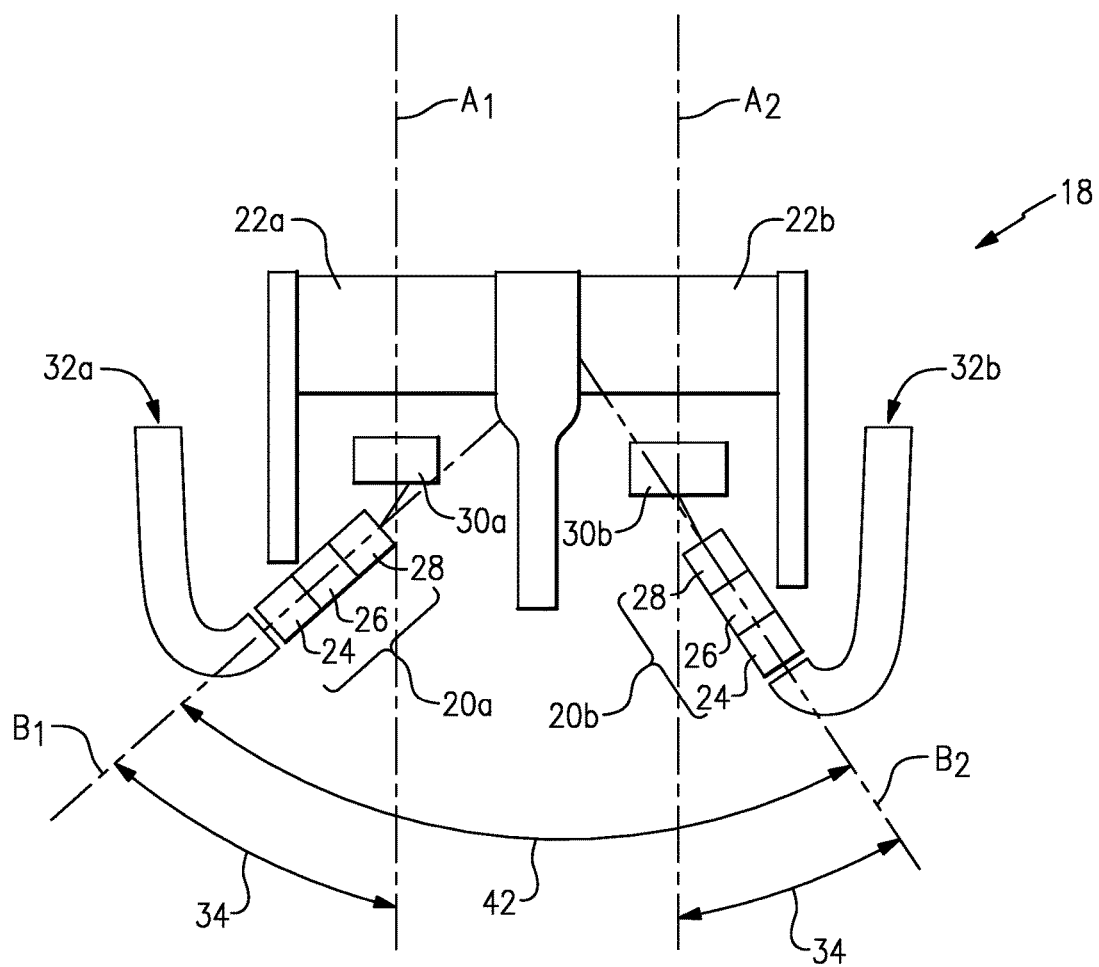
FIG. 2 is a schematic view of an example propulsion system.
Figure 3:
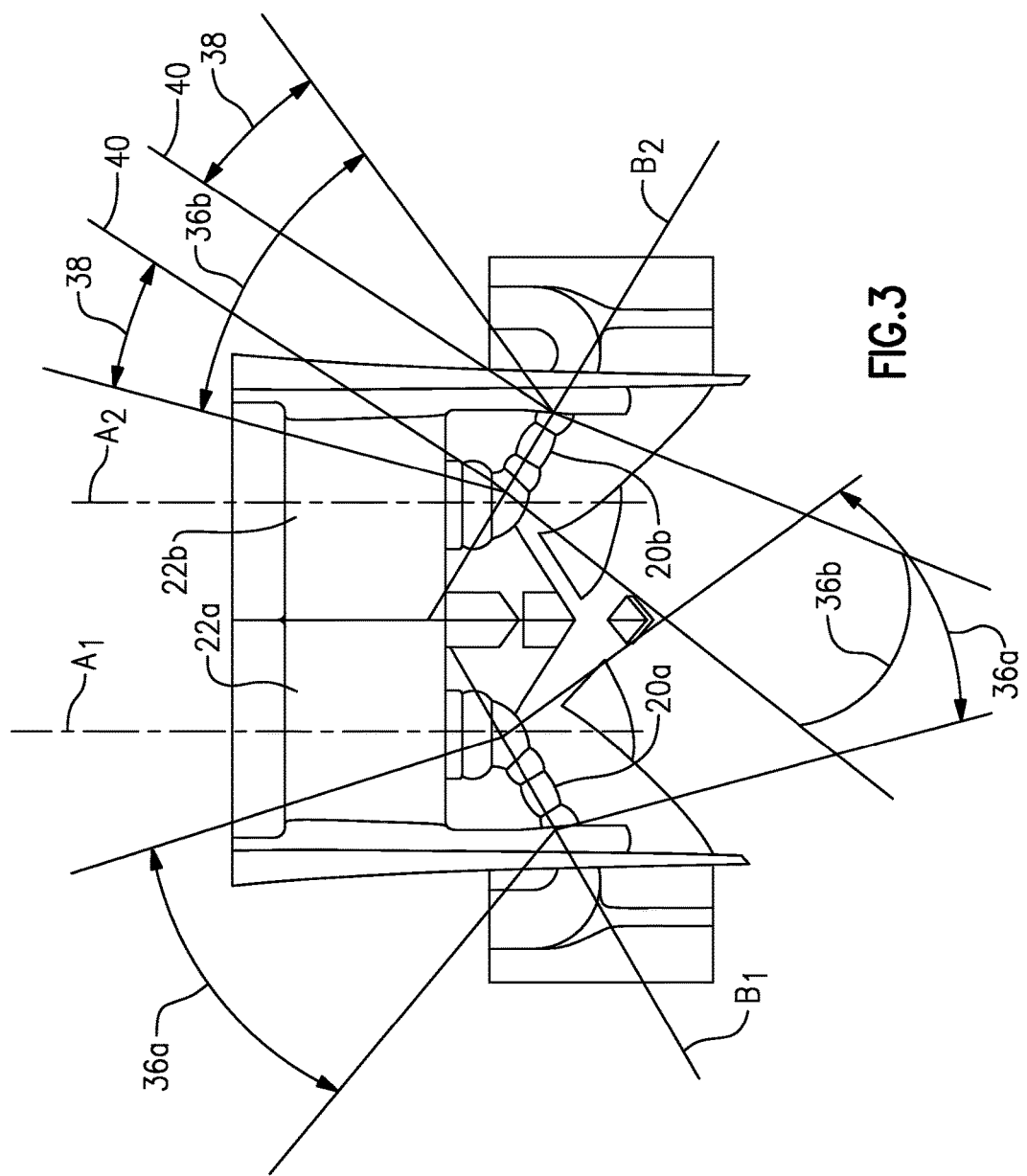
FIG. 3 is a schematic view of a burst zone defined about the example propulsion system.

Referring to FIGS. 2 and 3 with continued reference to FIG. 1, the propulsion system 18 is mounted aft end of the fuselage 12 and includes first and second engine cores 20a-b, which are reverse core gas turbine engines, that drive corresponding first and second propulsors that respectively include fan sections 22a-b. The first and second fan sections 22a-b provide the propulsive thrust of the disclosed propulsion system 18.

Each of the fan sections 22a-b are disposed about corresponding first and second propulsor axis A1 and A2. The first and second engine cores 20a-b is disposed about a corresponding first and second engine axis B1 and B2. That is the first engine core 20a is disposed about the first engine axis B1 and drives the first propulsor about the first propulsor axis A1. The second engine core 20b is disposed about the second engine axis B2 and drives the second fan section 22b about the second propulsor axis A2.

The example engine cores 20a-b are gas generators that include a compressor 24, a combustor 26 and a turbine 28. Air is drawn in through inlets 32a-b to the compressor 24 is compressed and communicated to a combustor 26. In the combustor 26, air is mixed with fuel and ignited to generate an exhaust gas stream that expands through the turbine 28 where energy is extracted and utilized to drive the compressor 24 and corresponding fan 22a-b. In this example the engine cores 20a-b drive the corresponding fan 22a-b through a geared architecture 30a-b.

In the disclosed example, each of the first and second propulsors 22a-b is mounted substantially parallel to each other about respective propulsor axes A1, A2. The first and second engine axes B1, B2 are disposed at an angle 34 relative to the corresponding propulsor axis A1, A2. In this example the angle 34 is greater than about thirty (30) degrees. As appreciated other angles are within the contemplation of this disclosure.

Referring to FIG. 3, with continued reference to FIG. 2, gas turbine engines are not typically mounted next to each other due to practical limitations related to overall aircraft survivability in the event of engine failure. A burst zone is defined between gas turbine engines within which another gas turbine engine is not permitted due to possible fragmentation from one failed engine disabling the second engine.

The disclosed engine cores 20a-b are disposed at the angle 34 relative to the corresponding propulsor axes A1 and A2 and to each other such that neither engine core 20a-b is disposed within a burst zone 36a-b of the other engine core 20a-b. In other words, each of the engine cores 20a-b is disposed at an angle away from the other engine core 20a-b such that each is orientated outside of the others bust zone 36a-b. In this example, the engine cores 20a-b are angled away from each other at an angle 42 (FIG. 2). In this example, the angle 42 is greater than about ninety (90) degrees. As appreciated other angles 42 could be utilized depending on the definition of respective burst zones 36a-b.

The respective bust zones 36a-b is defined as an annular region about the corresponding engine core 20a-b. In this example the annular region is disposed at an angle 38 outward from a line 40 perpendicular to the engine axis B1, B2. The example angle is at least fifteen (15) degrees and is determined based on application specific considerations. Moreover, airframe regulations may also define an angular span of the burst zones 36a-b and thereby the angle 38.

The burst zones 36a-b extend outwardly from the engine core 20a-b. Accordingly, aircraft structures such as wings and control surfaces are also a consideration with respect to the defined bust zones 36a-b. In some conventional aircraft architectures, control surfaces such as the horizontal stabilizer and wing structures may fall within the burst zone defined by the angled orientation of the engine cores 20a-b. Modifications to aircraft lift and control surfaces can be made but result in structural and aerodynamic concessions.

For example, a swept T-tail configuration could be utilized that sweeps the horizontal and vertical stabilizers forward and out of potential bust zones. However, such a forward swept configuration impacts structural considerations. Moreover, the primary wing would remain vulnerable.

Figure 4:
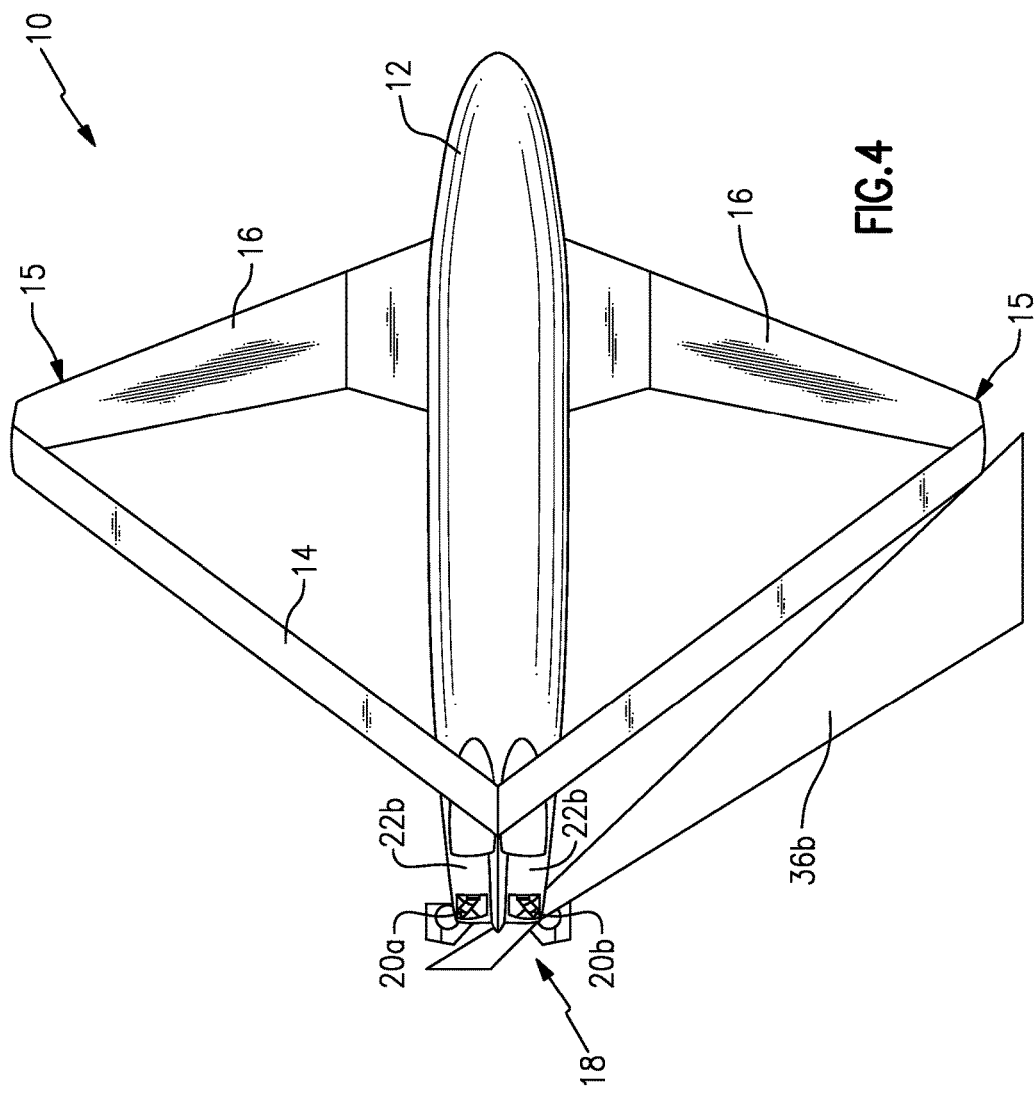
FIG. 4 is a schematic view of the example aircraft including a box wing structure disposed outside of the burst zone.

Referring to FIG. 4, the example box wing 15 enables the wings 16 to be moved forward compared to conventional aircraft designs. Moreover, the box wing 15 provides for the upper horizontal stabilizer 14 to be swept forward out of the illustrated burst zone 36b. The box wing 15 includes a continuous structure that is swept forward from the vertical stabilizer 25 to the forward wings 16. The swept forward configuration of the horizontal stabilizer 14 is disposed outside of the burst zone 36b. As appreciated, only one of the burst zones 36a-b is illustrated, and portions of the horizontal stabilizer 14 on each side of the aircraft 10 would be outside of the burst zones 36a-b. The box wing 15 further provides structural stability to the fuselage 12 of the aircraft 10 by connecting previously cantilevered portions of the wing 16 and horizontal stabilizer 14 into a single continuous structure.

Accordingly, the disclosed aircraft includes a box wing configuration that integrates the horizontal stabilizer with the primary wing. Such a configuration provides for a structurally more desirable horizontal stabilizer along with a shorter primary wing that is moved forward on the fuselage. The box-wing structure provides added stability while also positioning control surfaces outside of the defined burst zones. The disclosed box wing 15 enables integration of the propulsion system 18 within the fuselage 12 to enable alternate aircraft architectures.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. An aircraft lift system comprising;
an aft portion of a fuselage and a propulsion system mounted within the aft portion of the fuselage;
the propulsion system including first and second turbine engines, including respective first and second engine cores mounted so that respective first and second axes running therethrough are not-parallel;
wherein a defined burst zone from the engine cores extends outward and at a forward swept angle from the propulsion system, so that the burst zone has respective first and second forward edges; and
a box wing extending at a forward swept angle from the aft portion of the fuselage;
wherein first and second trailing edges of the box wing are disposed between respective first and second forward edges of the burst zone and the fuselage.

2. The system as recited in claim 1, wherein the box wing is a rhomboidal wing.

3. The system as recited in claim 1, wherein the box wing includes a forward primary wing portion and an upper horizontal stabilizer attached to the forward primary wing structure.

4. The system as recited in claim 3, including a vertical stabilizer extending from the aft portion of the fuselage supporting the upper horizontal stabilizer.

5. The system as recited in claim 4, wherein the vertical stabilizer is swept forward.

6. The system as recited in claim 1, wherein the propulsion system comprises a first turbine engine including a first engine core that drives a first propulsor, wherein the first propulsor is disposed about a first propulsor axis and a second turbine engine including a second engine core and a second propulsor, wherein the second propulsor is disposed about a second propulsor axis parallel to the first propulsor axis, and the first engine core and the second engine core are mounted at an angle relative to a corresponding one of the first and second propulsor axes.

7. The aircraft as recited in claim 6, wherein the first engine core is disposed about a first engine axis and the second engine core is disposed about a second engine axis, wherein the first engine axis and the second engine axis are angled away from each other.

8. The aircraft as recited in claim 7, wherein each of the first and second engine cores are each disposed outside of a burst zone defined about the other of the first and second engine cores.

9. The aircraft as recited in claim 8, wherein the burst zone is defined as burst angle relative to a line extending perpendicular to each end of the corresponding first and second engine core.

10. The aircraft as recited in claim 6, wherein a burst zone is defined about each of the first and second engine cores.

11. The aircraft as recited in claim 6, wherein the first and second engine cores comprise a reverse flow gas turbine engine.

12. The aircraft as recited in claim 11, wherein the first engine core is disposed about a first engine axis and the second engine core is disposed about a second engine axis, wherein the first engine axis and the second engine axis are angled away from each other.

13. The aircraft as recited in claim 11, wherein each of the first and second engine cores are each disposed outside of a burst zone defined about the other of the first and second engine cores.

14. The aircraft as recited in claim 11, wherein the first and second engine cores comprise a reverse flow gas turbine engine.

15. An aircraft comprising:
a fuselage including a forward portion and an aft portion;
a first turbine engine including a first engine core that drives a first propulsor, wherein the first propulsor is disposed about a first propulsor axis;
a second turbine engine including a second engine core and a second propulsor, wherein the second propulsor is disposed about a second propulsor axis parallel to the first propulsor axis, and the first engine core and the second engine core are mounted at an angle relative a corresponding one of the first and second propulsor axes, wherein a defined burst zone extends outward from each of the first and second engine cores; and
a box wing extending from the aft portion of the fuselage to a forward portion of the fuselage, where the box wing is disposed outside of the burst zone.

16. The aircraft as recited in claim 15, wherein the box wing includes a forward primary wing portion and an upper horizontal stabilizer attached to the forward primary wing structure.

17. The aircraft as recited in claim 16, wherein the vertical stabilizer is swept forward.

18. The aircraft as recited in claim 15, including a vertical stabilizer extending from the aft portion of the fuselage supporting the upper horizontal stabilizer.

* * * * *

UNITED STATES PATENT AND TRADEMARK OFFICE
CERTIFICATE OF CORRECTION

PATENT NO. : 9,567,062 B2
APPLICATION NO. : 14/440895
DATED : February 14, 2017
INVENTOR(S) : Jesse M. Chandler and Gabriel L. Suciu It is certified that error appears in the above-identified patent and that said Letters Patent is hereby corrected as shown below:

In the Specification

Column 1, Line 3 (approx.), please insert the following header and paragraph after the Title:
--STATEMENT REGARDING FEDERALLY SPONSORED RESEARCH OR DEVELOPMENT
This invention was made with government support under NASA Cooperative Agreement No. NNX11AB35A. The Government has certain rights in this invention.--

Signed and Sealed this
Twenty-fourth Day of October, 2017

Joseph Matal
*Performing the Functions and Duties of the*
*Under Secretary of Commerce for Intellectual Property and*
*Director of the United States Patent and Trademark Office*